(12) United States Patent
Nagasaka et al.

(10) Patent No.: US 10,481,012 B2
(45) Date of Patent: Nov. 19, 2019

(54) HEAT EXCHANGER

(71) Applicant: Rinnai Corporation, Nagoya-shi, Aichi (JP)

(72) Inventors: Toshimitsu Nagasaka, Nagoya (JP); Masakazu Ando, Nagoya (JP)

(73) Assignee: Rinnai Corporation, Nagoya-shi (JP)

( * ) Notice: Subject to any disclaimer, the term of this patent is extended or adjusted under 35 U.S.C. 154(b) by 24 days.

(21) Appl. No.: 15/868,089

(22) Filed: Jan. 11, 2018

(65) Prior Publication Data

US 2018/0224337 A1   Aug. 9, 2018

(30) Foreign Application Priority Data

Feb. 8, 2017   (JP) .................. 2017-021495

(51) Int. Cl.

| F24H 1/40 | (2006.01) |
|---|---|
| G01K 1/14 | (2006.01) |
| F28F 27/00 | (2006.01) |
| F28D 7/16 | (2006.01) |
| F28D 21/00 | (2006.01) |
| F24H 9/00 | (2006.01) |
| F24H 9/20 | (2006.01) |
| F24H 9/14 | (2006.01) |

(52) U.S. Cl.
CPC .............. *G01K 1/143* (2013.01); *F24H 1/40* (2013.01); *F24H 9/0026* (2013.01); *F24H 9/146* (2013.01); *F24H 9/2035* (2013.01); *F28D 7/1623* (2013.01); *F28D 21/0007* (2013.01); *F28F 27/00* (2013.01)

(58) Field of Classification Search
CPC .......... G01K 1/143; G01K 1/14; G01K 1/146; F28F 27/00; F28D 21/0007; F24H 1/40; F24H 9/0068; F24H 9/146; F24H 9/2007; F24H 9/2035
USPC ....... 165/11.1, 157, 158; 374/429, 141, 145, 374/140, 208
See application file for complete search history.

(56) References Cited

U.S. PATENT DOCUMENTS

| 2,475,604 | A | * | 7/1949 | Frisch | ....................... F28F 1/30 |
|---|---|---|---|---|---|
| | | | | | 165/158 |
| 3,357,249 | A | * | 12/1967 | Bernous | ................. G01K 13/08 |
| | | | | | 374/153 |
| 4,230,173 | A | * | 10/1980 | Eastman | ............. F28D 15/0266 |
| | | | | | 165/104.25 |

(Continued)

FOREIGN PATENT DOCUMENTS

| JP | 10-197073 | 7/1998 |
|---|---|---|
| JP | 2006-200829 | 8/2006 |

*Primary Examiner* — Filip Zec
(74) *Attorney, Agent, or Firm* — Amin, Turocy & Watson LLP (57) ABSTRACT

A heat exchanger (3) having a temperature sensor (16) detecting a temperature of a water passage (300) including heat-transfer pipes (32), (33), a connecting portion (34), an inlet pipe (11), and an outlet pipe (12), and a sensor bracket (6), wherein the sensor bracket (6) is joined and fixed to the connecting portion (34) in a state in which at least a part of a base portion (60) of the sensor bracket (6) forming a mounting surface of the temperature sensor (16) is in surface contact with a planar portion (340) provided in the connecting portion (34), and the temperature sensor (16) is secured to a joint portion (600) of the base portion (60) joined and fixed to the planar portion (340).

4 Claims, 6 Drawing Sheets

(56) References Cited

U.S. PATENT DOCUMENTS

| | | | | |
|---|---|---|---|---|
| 5,707,151 A | * | 1/1998 | Parker | G01K 1/143 236/DIG. 6 |
| 6,084,215 A | * | 7/2000 | Furuya | H01L 21/67248 118/500 |
| 7,540,864 B2 | * | 6/2009 | Faries, Jr. | A61M 5/14 374/147 |
| 7,597,472 B2 | * | 10/2009 | Hang | G01K 1/143 24/458 |
| 2004/0028118 A1 | * | 2/2004 | Sidoni | G01K 1/143 374/208 |
| 2011/0017433 A1 | * | 1/2011 | Feberwee | F24H 1/38 165/157 |
| 2013/0070808 A1 | * | 3/2013 | Daily | G01K 1/026 374/179 |
| 2016/0003685 A1 | * | 1/2016 | Walla | G01K 1/143 374/208 |

* cited by examiner

PRIOR ART

HEAT EXCHANGER

CROSS-REFERENCE TO RELATED APPLICATIONS

The present application claims a priority based on a Japanese Patent Application No. 2017-21495 filed on Feb. 8, 2017, the content of which is hereby incorporated by reference in its entirely.

BACKGROUND OF THE INVENTION

Field of the Invention

The present invention relates to a heat exchanger incorporated in a combustion device such as a water heater or a heat source device for a room heater. Especially, the present invention relates to the heat exchanger having a temperature sensor configured to detect a temperature of a water passage in the heat exchanger.

Description of the Related Art

Conventionally, in a heat exchanger incorporated in a combustion device such as a water heater or a heat source device for a room heater, in order to prevent an abnormal rise in a hot water temperature and overheating of a heat-transfer pipe, a temperature sensor detecting a temperature of a water passage of the heat exchanger is provided on an outer peripheral surface of a water pipe exposed to an outside of a peripheral wall of a case body of the heat exchanger. (For example, Japanese Unexamined Patent Publication Nos. JPH10-197073 A and JP2006-200829 A)

Figure 6:
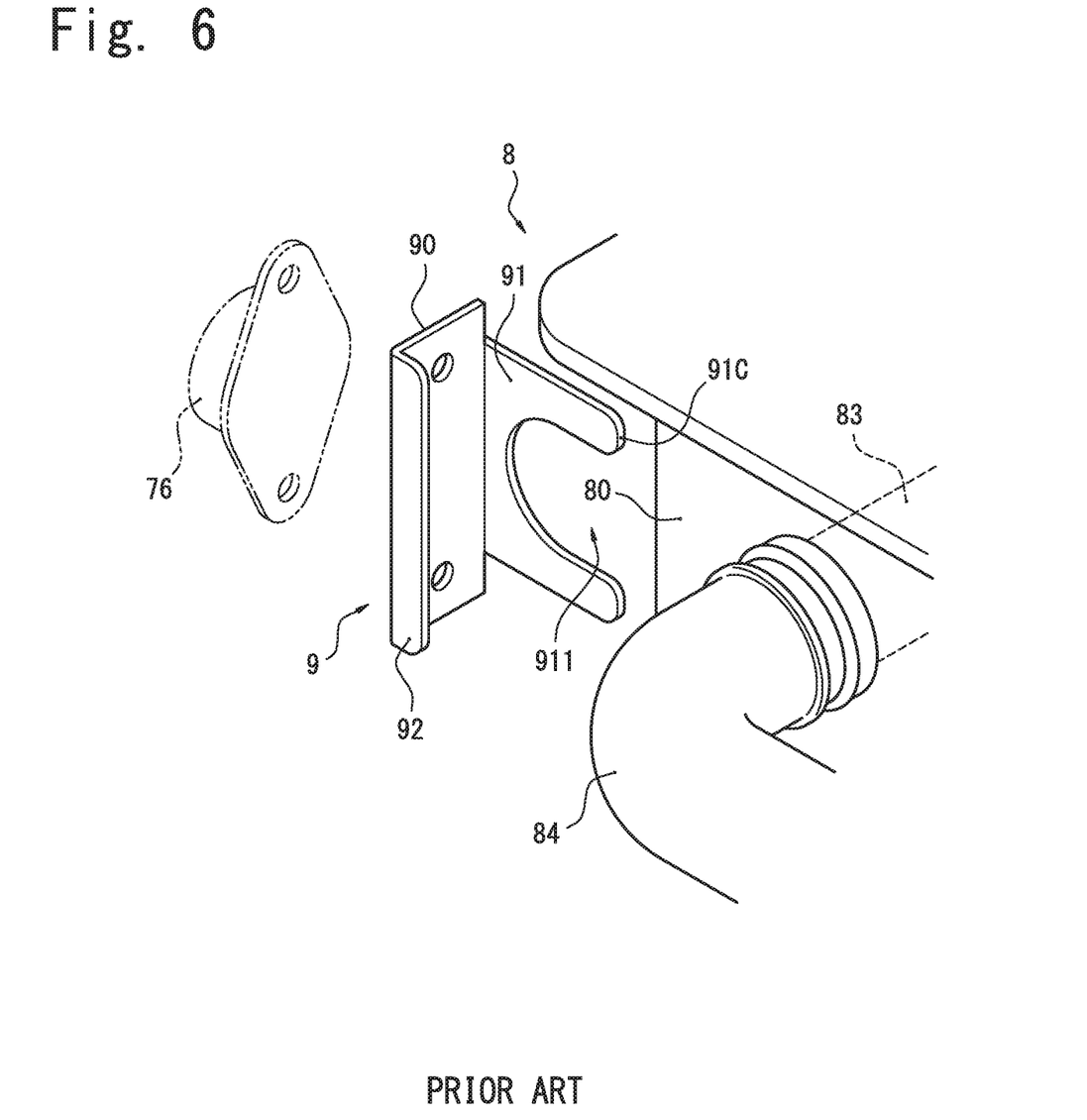
FIG. 6 is a schematic partial exploded perspective view showing a conventional heat exchanger.

For example, in a conventional heat exchanger 8 as shown in FIG. 6, a substantially L-shaped sensor bracket 9 is joined and fixed to an outer peripheral surface of a water pipe 84 extending from a heat-transfer pipe 83 disposed in a case body 80 to an outside of a peripheral wall of the case body 80. The sensor bracket 9 includes a rectangular plate-shaped base portion 90 and a substantially flat plate-shaped support plate 91 bent from one side edge in a front-and-back direction of the base portion 90 in one side in a left-and-right direction thereof. When the sensor bracket 9 is attached to the water pipe 84, first, a substantially U-shaped notch 911 provided at a front end 91C of the support plate 91 is fitted to the outer peripheral surface of the water pipe 84 extending to the outside of the peripheral wall of the case body 80. Subsequently, a periphery of a fitting portion of the notch 911 and the water pipe 84 is brazed in a state in which an end face of an auxiliary plate 92 bent in the same direction as the support plate 91 from the other side edge in the front-and-back direction of the base portion 90 is caused to abut against the outer peripheral surface of the water pipe 84, so that the sensor bracket 9 is joined and fixed to the water pipe 84. A temperature sensor 76 is then screwed to an outer side surface of the base portion 90. Therefore, the base portion 90 of the sensor bracket 9 is not in direct contact with the outer peripheral surface of the water pipe 84, and the temperature sensor 76 detects a temperature transmitted from the water pipe 84 to the base portion 90 via the support plate 91.

In the conventional heat exchanger 8 described above, an inner peripheral edge of the notch 911 of the sensor bracket 9 is joined and fixed to the outer peripheral surface of the water pipe 84. Therefore, a contact area between the water pipe 84 and the sensor bracket 9 is extremely small. In particular, when the water pipe 84 and the sensor bracket 9 are made of a low thermal conductive material such as stainless steel-based metal, a temperature of the heat-transfer pipe 83 is hardly transmitted to the temperature sensor 76. Further, a contact failure tends to occur between the water pipe 84 and the sensor bracket 9 due to a manufacturing error of the sensor bracket 9 and an assembling error of the sensor bracket 9 to the water pipe 84. As a result, there are problems that responsiveness of the temperature sensor 76 decreases and that detection accuracy thereof varies.

SUMMARY OF THE INVENTION

The present invention has been made to solve the problems described above, and an object of the present invention is to improve responsiveness and detection accuracy of a temperature sensor in a heat exchanger incorporated in a combustion device such as a water heater or a heat source device for a room heater.

According to one aspect of the present invention, there is provided a heat exchanger comprising:
a case body;
a plurality of heat-transfer pipes disposed in the case body;
a connecting portion configured to connect pipe ends of the plurality of heat-transfer pipes outside a side wall of the case body;
an inlet pipe configured to supply a fluid to be heated into the heat-transfer pipes;
an outlet pipe configured to lead out the fluid to be heated from the heat-transfer pipes;
a temperature sensor configured to detect a temperature of a water passage formed of the heat-transfer pipes, the connecting portion, the inlet pipe, and the outlet pipe; and
a sensor bracket configured to fix the temperature sensor, wherein
the sensor bracket is joined and fixed to the connecting portion,
at least a part of a base portion of the sensor bracket forming a mounting surface of the temperature sensor is in surface contact with a planar portion provided in the connecting portion, and
the temperature sensor is secured to a joint portion of the base portion joined and fixed to the connecting portion.

According to the present invention, even when the heat-transfer pipe, the connecting portion, and the sensor bracket are made of a low thermal conductive material, the temperature of the water passage can be more promptly and reliably transmitted to the temperature sensor. Accordingly, the responsiveness and the detection accuracy of the temperature sensor can be improved.

Other objects, features and advantages of the present invention will become more fully understood from the detailed description given hereinbelow and the accompanying drawings which are given byway of illustration only, and thus are not to be considered as limiting the present invention.

DESCRIPTION OF THE EMBODIMENTS

Hereinafter, referring to drawings, a heat exchanger according to an embodiment of the present invention will be described in detail.

Figure 1:
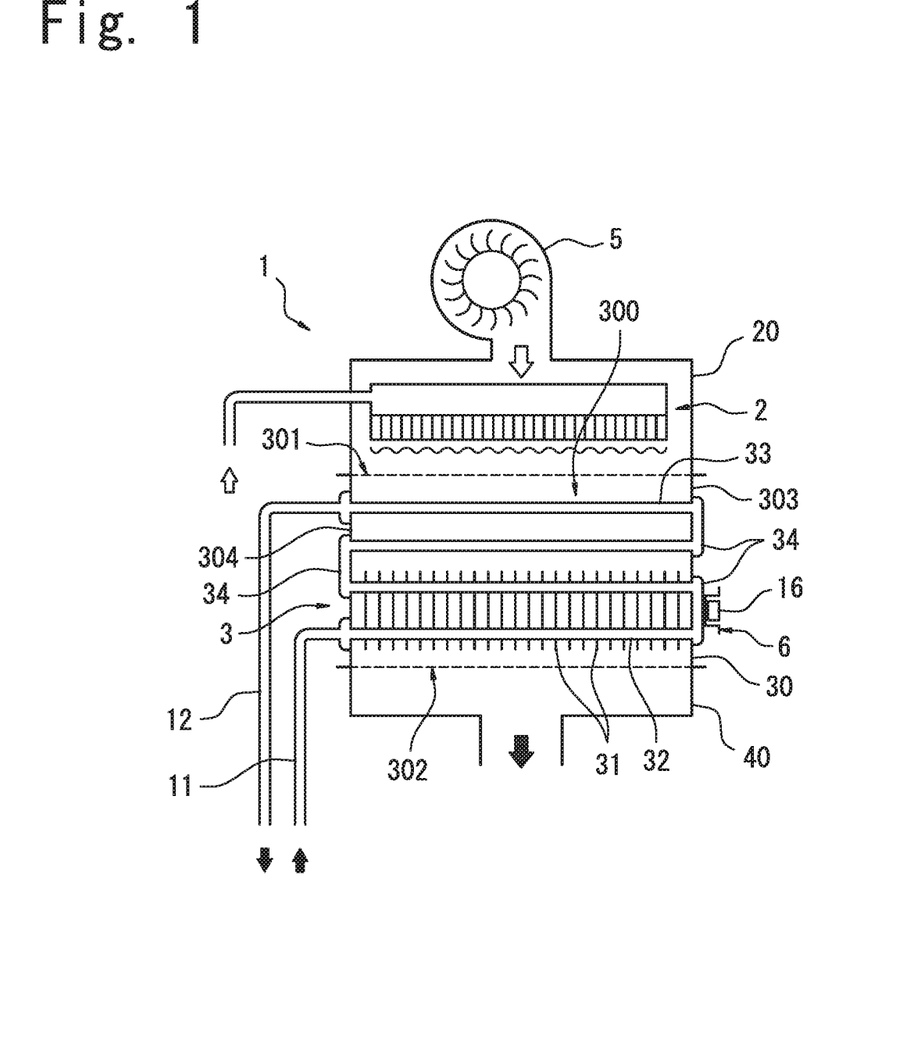
FIG. 1 is a schematic configuration diagram showing one example of a combustion device including a heat exchanger according to an embodiment of the present invention.

As shown in FIG. 1, the heat exchanger 3 according to the present embodiment is incorporated in a water heater 1. The water heater 1 heats a fluid to be heated (in this embodiment, water) supplied into first heat-transfer pipes 32 and second heat-transfer pipes 33 from an inlet pipe (in this embodiment, a water supply pipe) 11 with combustion exhaust gas ejected from a burner 2, and supplies a heated fluid to a supply terminal (not shown) such as a faucet or a shower through an outlet pipe (in this embodiment, a hot-water supply pipe) 12.

A case body 30 constituting an outer case of the heat exchanger 3 is made of stainless steel-based metal. The case body 30 has a substantially rectangular box shape, and includes upper and lower openings 301, 302. The upper opening 301 is continuously connected to a combustion chamber casing 20 accommodating the burner 2 therein. On the other hand, the lower opening 302 is continuously connected to an exhaust chamber casing 40 guiding the combustion exhaust gas to an outside of the water heater 1.

An upper portion of the combustion chamber casing 20 is connected to a fan unit 5 supplying air outside the water heater 1 into the combustion chamber casing 20 as air for combustion of the burner 2. The combustion exhaust gas ejected from the burner 2 is introduced into the case body 30 of the heat exchanger 3 from the upper opening 301 together with the air fed into the combustion chamber casing 20 by the fan unit 5. Then, the combustion exhaust gas is discharged from the lower opening 302 through the exhaust chamber casing 40 to the outside of the water heater 1.

Between front and back facing side walls 303, 304 of the case body 30, a plurality of plate-shaped heat-transfer fins 31 made of stainless steel-based metal are provided vertically, and arranged side horizontally by side at predetermined intervals in parallel with the front and back side walls 303, 304. The heat-transfer fins 31 are provided in a space in a substantially lower half region in the case body 30 (that is, a space on a lower opening 302 side). In addition, a plurality of first heat-transfer pipes 32 made of stainless steel-based metal are disposed so as to be inserted through the heat-transfer fins 31 in a direction perpendicular to the heat-transfer fins 31. Each of the first heat-transfer pipes 32 is made of a straight pipe having a substantially elliptical cross-sectional shape elongated in an up-and-down direction. In the following description of the present specification, an outer surface of the front side wall 303 corresponds to a front of the heat exchanger 3, a side on which the fan unit 5 provided corresponds to an upper side of the heat exchanger 3, a depth direction as viewed from a front side of the case body 30 corresponds to a front-and-back direction, and a width direction and a height direction as similarly viewed correspond to a left-and-right direction and an up-and-down direction, respectively.

The plurality of first heat-transfer pipes 32 are arranged in a so-called staggered shape in two upper and lower stages in the substantially lower half region in the case body 30 in such a manner that tube centers of the first heat-transfer pipes 32 in the upper stage and tube centers of the first heat-transfer pipes 32 in the lower stage are displaced from one another by a half pitch in the left-and-right direction. On the other hand, a plurality of second heat-transfer pipes 33 made of stainless steel-based metal are disposed in a space in a substantially upper half region in the case body 30. Each of the second heat-transfer pipes 33 is made of a straight pipe having a substantially circular cross-sectional shape. The plurality of second heat-transfer pipes 33 are disposed along left and side walls 305, 306 of the case body 30 (see FIG. 2). The combustion exhaust gas introduced from the combustion chamber casing 20 into the case body 30 is guided to a setting section of the first heat-transfer pipes 32 through a setting section of the second heat-transfer pipes 33, and then led out to the exhaust chamber casing 40. At this time, a part of sensible heat in the combustion exhaust gas is recovered by the second heat-transfer pipes 33, and further sensible heat in the combustion exhaust gas is recovered by the first heat-transfer pipes 32. Thereby, the heated fluid at a predetermined temperature is supplied to the supply terminal.

Figure 2:
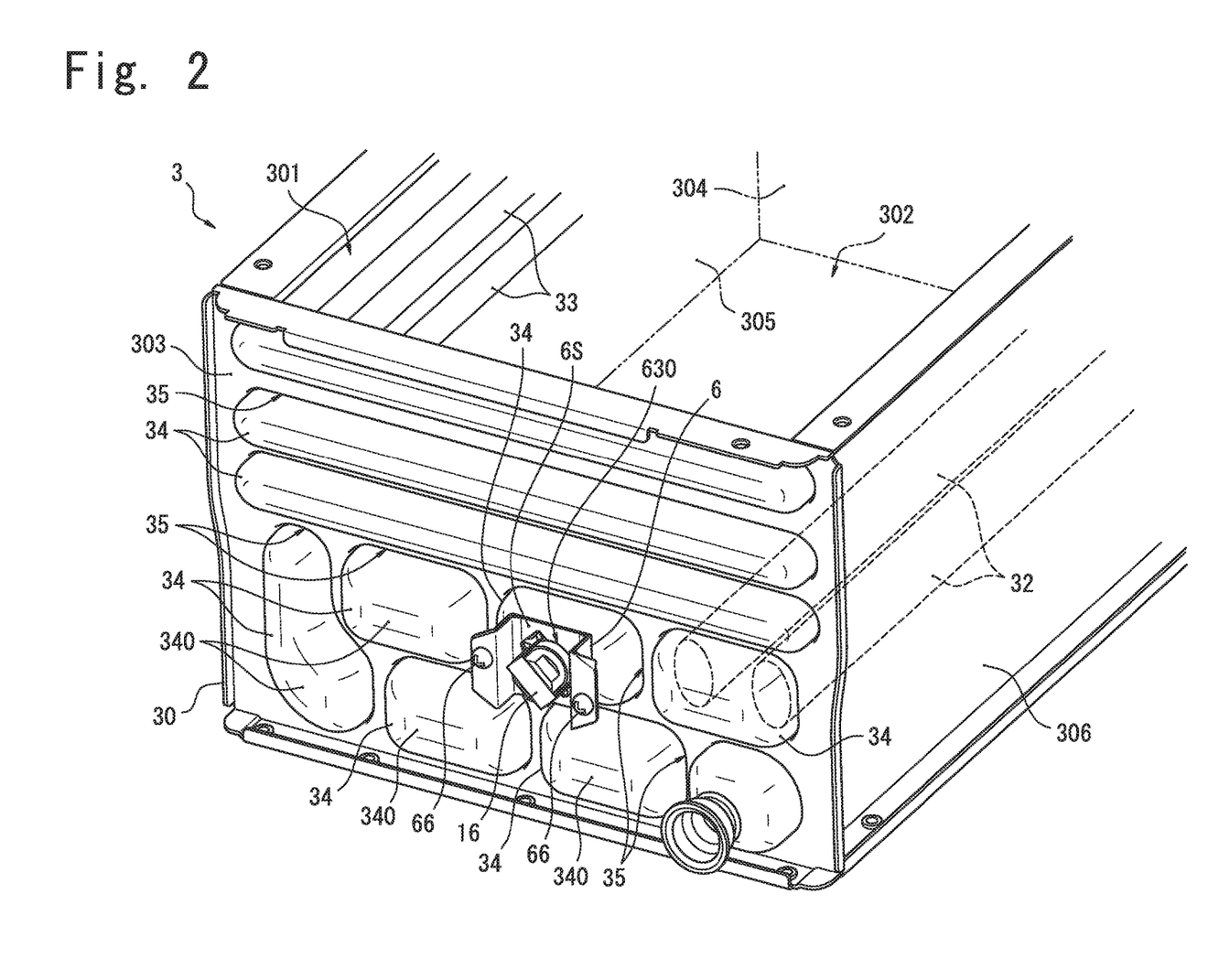
FIG. 2 is a schematic perspective view showing one example of the heat exchanger according to the embodiment of the present invention.

As shown in FIG. 2, pipe ends of the two adjacent first heat-transfer pipes 32 are connected in series to each other by a connecting header 34 outside the front and back side walls 303, 304. Similarly, pipe ends of the two adjacent second heat-transfer pipes 33 are connected in series to each other by a connecting header 34 outside the front and back side walls 303, 304.

Although not shown, pipe ends of a specific set of the first heat-transfer pipe 32 and the second heat-transfer pipe 33 are connected in series to each other by a connecting header 34 outside the back side wall 304. Further, the inlet pipe 11 is connected to a pipe end of the first heat-transfer pipe 32 that is located at the uppermost stream among the plurality of first heat-transfer pipes 32, and the outlet pipe 12 is connected to a pipe end of the second heat-transfer pipe 33 that is located at the lowermost stream among the plurality of second heat-transfer pipes 33. Namely, the heat exchanger 3 has a water passage 300 of the fluid to be heated, which includes the first heat-transfer pipes 32, the second heat-transfer pipes 33, the connecting headers 34, the inlet pipe 11, and the outlet pipe 12 (see FIG. 1). Accordingly, the fluid to be heated supplied into the inlet pipe 11 is fed to the second heat-transfer pipes 33 through the first heat-transfer pipes 32, and discharged to the supply terminal outside the water heater 1 from the outlet pipe 12. Meanwhile, in the present embodiment, the first and second heat-transfer pipes 32, 33 are respectively connected to each other in series by the connecting header 34. However, the first and second heat-transfer pipes 32, 33 may be respectively connected to each other in parallel by the connecting header 34.

Figure 3:
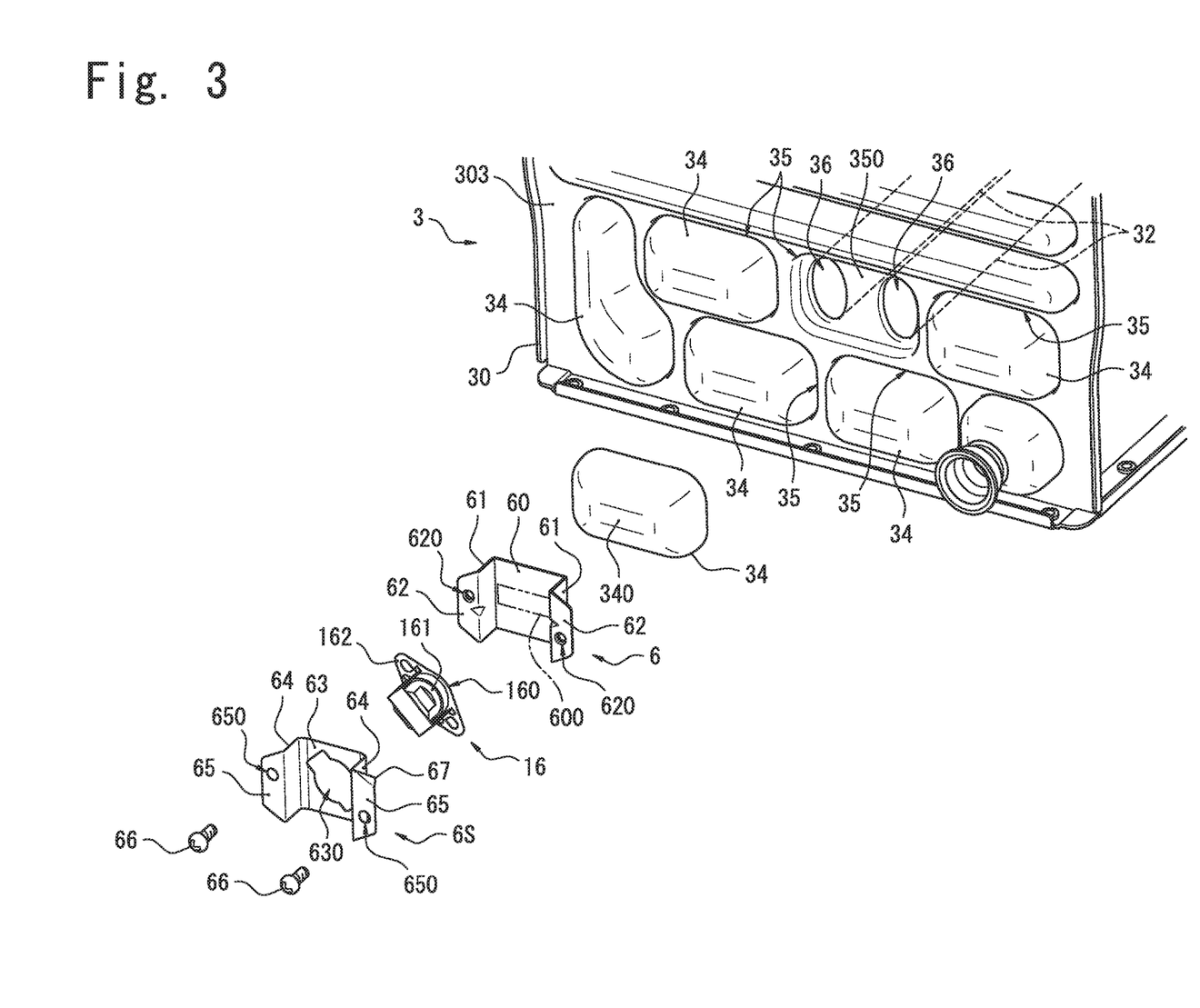
FIG. 3 is a schematic partial exploded perspective view showing one example of the heat exchanger according to the embodiment of the present invention.
Figure 4:
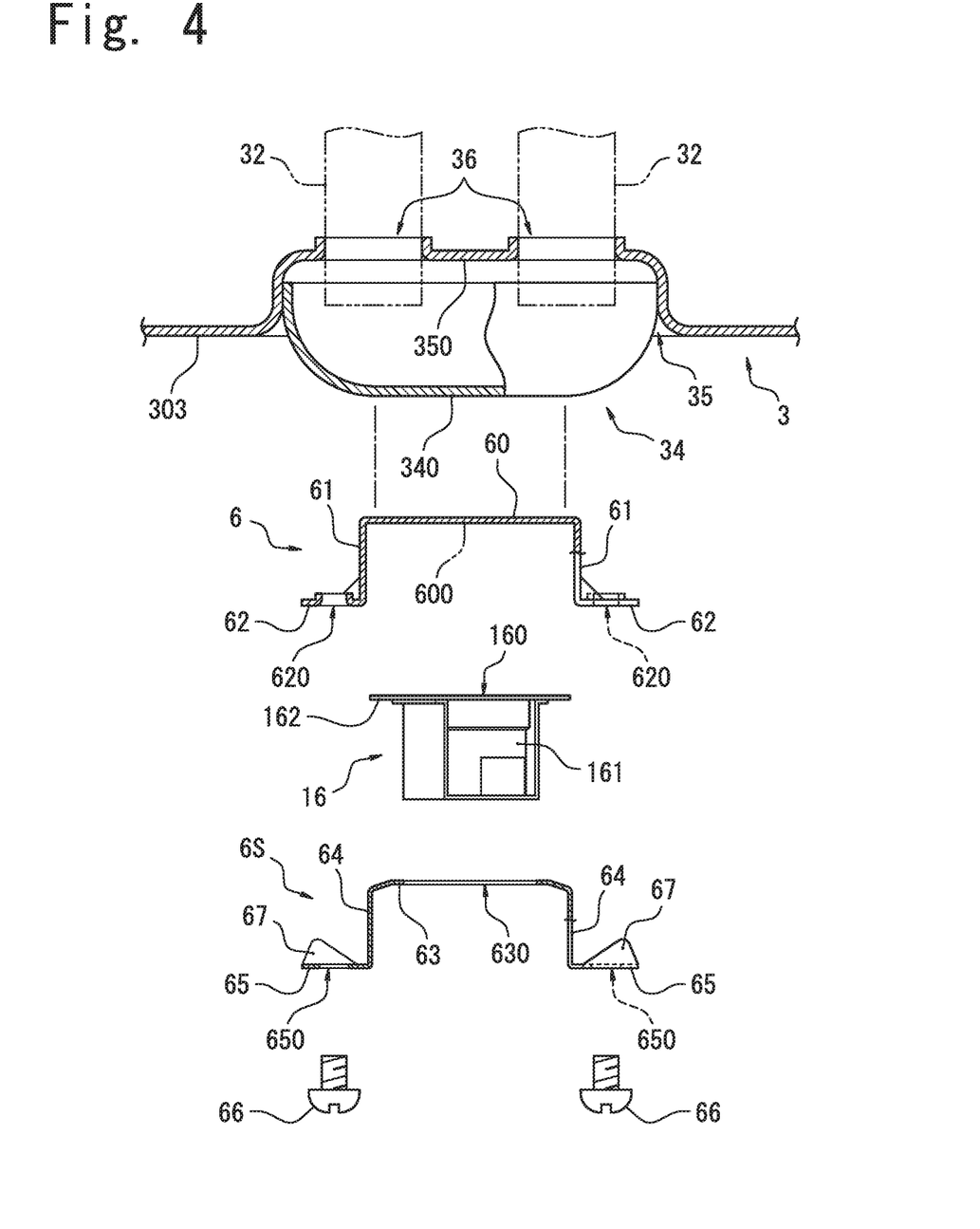
FIG. 4 is a schematic partial exploded cross-sectional view showing one example of the heat exchanger according to the embodiment of the present invention.

As shown in FIGS. 2 to 4, a plurality of drawn portions 35 recessed inward of the case body 30 are formed on the front and back side walls 303, 304 of the case body 30. The first and second heat-transfer pipes 32, 33 are brazed to peripheral edge portions of heat-transfer-pipe introduction holes 36 opened in inner walls 350 of the above-described drawn portions 35, respectively. Therefore, the inner wall 350 of each of the drawn portions 35 constitutes a heat-transfer-pipe fixing portion for fixing the pipe end of each of the first and second heat-transfer pipes 32, 33.

An open end of each of the drawn portions 35 is formed into a shape substantially coincident with an open end of the connecting header 34. The connecting header 34 is tightly fitted into an inner peripheral edge of the drawn portion 35 from outside the case body 30, and is brazed and fixed to the drawn portion 35. As a result, the two adjacent heat-transfer-pipe introduction holes 36 are communicated to each other via a space defined between the connecting header 34 and the inner wall 350 of the drawn portion 35. That is, the connecting header 34 constitutes a connecting portion for connecting the pipe ends of the two adjacent heat-transfer pipes 32, 33 outside the case body 30.

The connecting header 34 has a substantially box shape having an opening in one surface facing the front side wall 303 or the back side wall 304 of the case body 30, and covering the drawn portion 35 from outside the case body 30. Further, a central portion (hereinafter, referred to as an "outer surface center") 340 in the other surface of the connecting header 34 opposite to the one surface in which the above-described opening is provided has a plane substantially parallel to the front or back side wall 303, 304 of the case body 30.

Via a sensor bracket 6, a temperature sensor 16 is attached to a specific connecting header 34 among a plurality of the connecting headers 34, each of which connects the pipe ends of the two adjacent first heat-transfer pipes 32. The temperature sensor 16 functions as an overheat detection sensor for detecting an abnormal rise in the temperature of the water passage 300 (in this embodiment, the first heat-transfer pipe 32).

Although not shown, a control circuit is incorporated in an inside of the water heater 1. The control circuit controls a variety of operations of the entire water heater 1 such as an ignition or extinguishing operation of the burner 2, an air supply amount adjustment operation of the fan unit 5 and an overheat prevention operation for forcibly stopping the combustion of the burner 2 upon detection of the abnormal rise in the temperature of the water passage 300. The temperature sensor 16 is connected to the control circuit through electric wiring.

As shown in FIGS. 3 and 4, the sensor bracket 6 is formed by bending a stainless steel-based metal plate into a substantially U-shape when viewed from the above. At a middle portion of the sensor bracket 6 in the left-and-right direction, the sensor bracket 6 has a flat plate-shaped base portion 60 serving as a mounting surface of the temperature sensor 16. The sensor bracket 6 is joined and fixed to the connecting header 34 by brazing in a state in which a vertical center portion (hereinafter referred to as "base portion center") 600 of the base portion 60 is brought into surface contact with the outer surface center 340 of the connecting header 34. That is, the outer surface center 340 of the connecting header 34 constitutes a planar portion for joining and fixing the sensor bracket 6, and the base portion center 600 constitutes a joint portion to be joined and fixed to the connecting header 34. Although not shown, before the connecting header 34 and the sensor bracket 6 are brazed and fixed to each other, at least one predetermined spot of the base portion center 600 of the sensor bracket 6 is temporarily fixed to the outer surface center 340 of the connecting header 34 by spot welding. Thereby, in a brazing process, it is possible to prevent the sensor bracket 6 from falling off or prevent misalignment from the connecting header 34.

Side extensions 61 which extend toward a front side of the front side wall 303 (that is, in a direction outward from the case body 30) are respectively formed on left and right side edges of the base portion 60. In addition, on front ends of the respective side extensions 61, receiving flanges 62 which serve as connecting/fixing portions for connecting and fixing a pressing plate 6S (a pressing member) are extended outward in the left-and-right direction. Screw holes 620 for screwing fixing screws 66 are formed in the respective receiving flanges 62.

The temperature sensor 16 is secured to the sensor bracket 6 in such a manner that, from a front side of the sensor bracket 6, the temperature sensor 16 is pressed against the sensor bracket 6 by the pressing plate 6S in a state in which a detection surface 160 is brought into surface contact with a front surface of the base portion center 600. The temperature sensor 16 according to this embodiment is a general-purpose product usable for detecting not only the temperature of the connecting header 34 but also temperatures of other various components constituting the water passage 300, such as the inlet pipe 11 and the outlet pipe 12. Therefore, a mounting flange 162 for screwing the temperature sensor 16 to an object other than the sensor bracket 6, is formed on an outer peripheral end edge of the sensor body 161 on a detection surface 160 side. As long as the temperature of the water passage 300 can be accurately detected, the temperature sensor 16 may be configured so that the detection surface 160 comes into contact with substantially an entire region or partial region of the base portion center 600 on a temperature sensor 16 side.

Like the sensor bracket 6, the pressing plate 6S is formed by bending a stainless steel-based metal plate into a substantially U-shape when viewed from the above. When the pressing plate 6S is attached to the sensor bracket 6, a flat contact plate 63 located at a middle portion of the pressing plate 6S in the left-and-right direction overlaps the base portion 60 of the sensor bracket 6 from the front side. As a result, substantially an entire circumference of the mounting flange 162 of the temperature sensor 16 is sandwiched between the contact plate 63 and the base portion 60.

A sensor insertion hole (a sensor insertion portion) 630 for inserting a sensor body 161 therethrough is formed at a center of the contact plate 63. Hence, when the pressing plate 6S is attached to the sensor bracket 6, the contact plate 63 abuts on a front surface of the mounting flange 162 without interfering with the sensor body 161. The sensor insertion portion may be formed as a cutout portion.

On left and right side edges of the contact plate 63, the side extensions 64 extending forward are formed. Further, on front ends of the respective side extensions 64, pressing flanges 65 are extended outward in the left-and-right direction. The pressing flanges 65 serve as connecting/fixing portions to connect and fix to the sensor bracket 6 when the pressing flanges 65 is overlapped with the receiving flanges 62 of the sensor bracket 6 from the front side. Screw insertion holes 650 are opened in the pressing flanges 65. The fixing screws (fixing members) 66 are screwed into the screw holes 620 of the receiving flanges 62 through the screw insertion holes 650, whereby the pressing plate 6S is screwed and secured to the sensor bracket 6. As a result, the contact plate 63 abuts against the mounting flange 162 in a pressed state, and the temperature sensor 16 is removably secured to the front surface of the base portion 60 of the sensor bracket 6.

The side extensions 61 of the sensor bracket 6 and the side extensions 64 of the pressing plate 6S are respectively extended forward when viewed from the outer surface center 340 of the connecting header 34. Therefore, the sensor bracket 6 and the pressing plate 6S are connected and secured to each other by the fixing screws 66 at a position located forward of the case body by a predetermined distance away from the outer surface center 340 of the connecting header 34 (that is, outward of the case body 30).

Moreover, positioning protrusions 67 protruding backward (toward the sensor bracket 6) are formed by partially bending outer edges of the respective pressing flanges 65. Thereby, when the pressing plate 6S is attached to the sensor bracket 6, the protrusions 67 engage outer edges of the receiving flanges 62, whereby centers of the screw insertion holes 650 and centers of the screw holes 620 of the receiving flanges 62 substantially coincide with each other.

Figure 5:
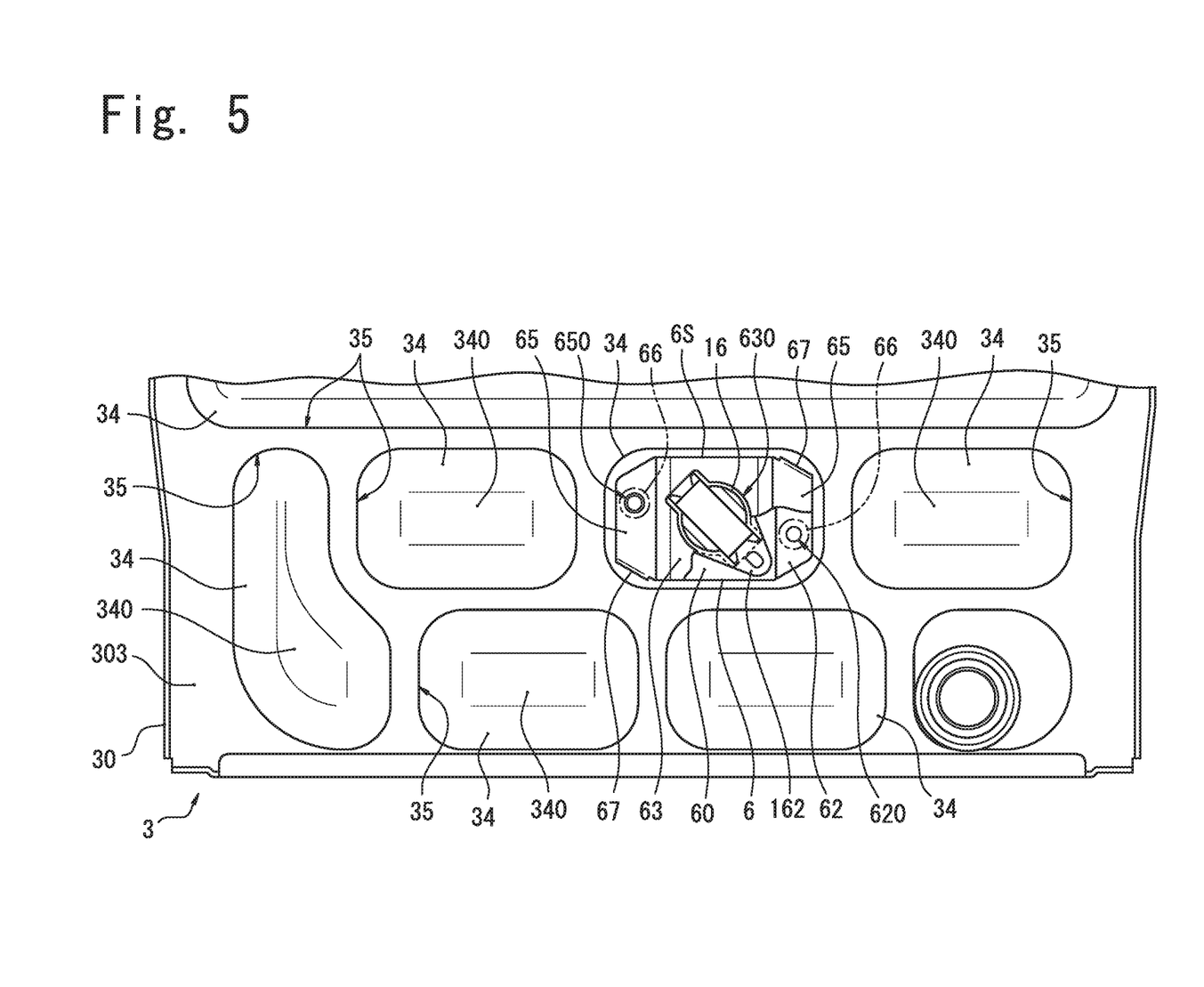
FIG. 5 is a schematic front view showing one example of the heat exchanger according to the embodiment of the present invention.

As shown in FIG. 5, when the sensor bracket 6 and the pressing plate 6S are viewed in a normal line direction (the front side of the front side wall 303) of the outer surface center 340 of the connecting header 34, the sensor bracket 6 and the pressing plate 6S are formed so as to be entirely located inward of a peripheral edge portion of the connecting header 34 as an object to be attached therewith. That is, when the sensor bracket 6 and the pressing plate 6S are viewed in the normal line direction of the outer surface center 340 of the connecting header 34, the sensor bracket 6 and the pressing plate 6S are configured so that inner areas of outer circumferences thereof become smaller than that of the connecting header 34. However, unlike this embodiment, the sensor bracket 6 and the pressing plate 6S may be configured so as to be entirely located inward of the peripheral edge portion of the connecting header 34 when the sensor bracket 6 and the pressing plate 6S are viewed in an obliquely forward direction from any of upper, lower, left, and right sides of the front side wall 303.

A process of assembling components around the temperature sensor 16 in the above-described heat exchanger 3 will be schematically described with reference to FIG. 3. First, prior to the brazing process, the sensor bracket 6 is temporarily fixed to the outer surface center 340 of the specific connecting header 34 by spot welding. On the other hand, the heat-transfer pipes 32, 33 are press-fitted into the heat-transfer-pipe introduction holes 36 formed in the front and back side walls 303, 304 of the case body 30 from an inside of the case body 30. Subsequently, a paste-like brazing material is applied along boundaries between the outer peripheral surfaces of the heat-transfer pipes 32, 33 and the inner peripheral edges of the heat-transfer-pipe introduction holes 36. Alternatively, annular solid brazing materials may be disposed on the inner peripheral edges of the heat-transfer-pipe introduction holes 36, respectively. The specific connecting header 34 to which the sensor bracket 6 is attached and other connecting headers 34 are tightly fitted into the drawn portions 35 formed in the front and back side walls 303, 304 of the case body 30. Subsequently, the paste-like brazing material is applied along the boundaries between the connecting headers 34 and the drawn portions 35. Further, likewise, the paste-like brazing material is also applied to a peripheral edge of the contact surface where the base portion 60 of the sensor bracket 6 and the outer surface center 340 of the connecting header 34 are in contact with each other. Alternatively, a rod-shaped solid brazing material may be disposed around the peripheral edge of the above-described contact surface. A sub-assembly of the heat exchanger 3 fabricated as described above is housed in a furnace and is subjected to heat treatment. Then, molten brazing material uniformly penetrates the boundaries and the contact surface. As a result, the heat-transfer pipes 32, 33 and the connecting headers 34 are solidly joined and fixed to the case body 30, and the sensor brackets 6 are solidly joined and fixed to the connecting headers 34. After the blazing process is completed as described above, the temperature sensor 16 is held and secured to the sensor bracket 6 by being sandwiched between the sensor bracket 6 and the pressing plate 6S.

In accordance with this embodiment, the sensor bracket 6 is joined and fixed to the connecting header 34 in a state in which one surface of the base portion 60 is in surface contact with the outer surface center 340 of the connecting header 34. Further, the temperature sensor 16 is held and secured on the other surface of the base portion 60 (as the joint portion with the outer surface center 340 of the connecting header 34). Therefore, even if components such as the case body 30, the heat-transfer pipes 32, 33, the connecting headers 34, and the sensor bracket 6 are made of a low thermal conductive material such as stainless steel-based metal, the temperature of the water passage 300 is promptly and reliably transmitted to the temperature sensor 16 via the large contact surface between the connecting header 34 and the sensor bracket 6. Further, the connecting header 34 and the sensor bracket 6 are joined and fixed to each other in a state in which the base portion 60 is in large surface contact with the outer surface center 340. Therefore, even if a manufacturing error of the sensor bracket 6 and an assembling error of the sensor bracket 6 to the connecting header 34 occur to some extent, a contact failure is unlikely to occur between the connecting header 34 and the sensor bracket 6. Thereby, responsiveness and detection accuracy of the temperature sensor 16 are improved.

Further, in accordance with this embodiment, the temperature sensor 16 is secured to the sensor bracket 6 in a state in which substantially the entire circumference of the mounting flange 162 formed around the temperature sensor 16 is sandwiched between the sensor bracket 6 and the pressing plate 6S. Therefore, it is unnecessary to directly screw the temperature sensor 16 to the sensor bracket 6. Thereby, even if such a general-purpose temperature sensor 16 as in the above-described embodiment is used, it is possible to bring the temperature sensor 16 into close contact with the sensor bracket 6 appropriately. As a result, the temperature of the water passage 300 is more promptly and reliably transmitted to the temperature sensor 16.

Furthermore, in accordance with this embodiment, the sensor bracket 6 and the pressing plate 6S are connected to each other by the fixing screws 66 at the position located forward of the case body 30 by the predetermined distance away from the outer surface center 340 of the connecting header 34. Therefore, when the fixing screws 66 are screwed into the screw holes 620 through the screw insertion holes 650, the fixing screw 66 is unlikely to interfere with the front side wall 303, the connecting header 34, and the like, and the temperature sensor 16 can be more appropriately brought into contact with the sensor bracket 6. As a result, the temperature of the water passage 300 is more promptly and reliably transmitted to the temperature sensor 16.

Further, in accordance with this embodiment, when the sensor bracket 6 is viewed from the front side of the front side wall 303, substantially the entire sensor bracket 6 is disposed inward of the peripheral edge portion of the connecting header 34. Therefore, when the brazing material is applied to the boundary between the connecting header 34 and the drawn portion 35, the sensor bracket 6 is unlikely to disturb the work. Therefore, the connecting header 34 can be smoothly and appropriately joined and fixed to the front side wall 303.

In the above-described embodiment, such an attachment structure of the temperature sensor 16 as the overheat detection sensor has been described. However, the above-described attachment structure can also be applied to an attachment structure of an inlet water temperature sensor for detecting the temperature of the fluid supplied to the inlet pipe 11, and to an attachment structure of a hot-water supply temperature sensor for detecting the temperature of the fluid led out from the outlet pipe 12 to a hot water supply terminal.

Further, in the above embodiment, the base portion center 600 is joined and fixed to the outer surface center 340 of the connecting header 34. However, the entire base portion 60 may be joined and fixed to the outer surface center 340. Further, a region shifted in any one of upward, downward, rightward, and leftward directions from the base portion center 600 may be joined and fixed to the outer surface center 340. Furthermore, the temperature sensor 16 may be secured to the sensor bracket 6 in such a manner that the detection surface 160 is brought into surface contact with a position shifted in any one of upward, downward, rightward, and leftward directions from the base portion center 600 in accordance with the position of the joint portion of the base portion 60 to be joined and fixed to the outer surface center 340.

Further, in the above-described embodiment, the connecting header 34 having a substantially box shape constitutes the connecting portion. That is, the sensor bracket 6 is joined and fixed to the connecting header 34 in a state in which the sensor bracket 6 is in surface contact with the outer surface center 340 of the connecting header 34. However, when the pipe ends of the two first heat-transfer pipes 32 or the pipe ends of the two second heat-transfer pipes 33 are connected to each other by a U-shaped pipe outside the case body 30, the sensor bracket 6 may be joined and fixed to a planar portion formed at a predetermined position of the U-shaped pipe. In this case, the U-shaped pipe serves as the connecting portion.

The present invention is not limited to a heat exchanger incorporated in a water heater. The present invention can also be applied to a heat exchanger incorporated in a combustion device such as a heat source device for a room heater circulating a fluid to be heated to a hot water heating terminal or a heat source device for a storage type water heater system. Further, the present invention is not limited to a heat exchanger of a so-called downward combustion-type combustion device in which the combustion exhaust gas flows from the upper side to the lower side with respect to the heat exchanger as in the above embodiment. The present invention can also be applied to a heat exchanger of a so-called upward combustion-type combustion device in which the combustion exhaust gas flows from the lower side to the upper side with respect to the heat exchanger.

As described above in detail, the present invention is summarized as follows.

According to one aspect of the present invention, there is provided a heat exchanger comprising:

a case body;

a plurality of heat-transfer pipes disposed in the case body;

a connecting portion configured to connect pipe ends of the plurality of heat-transfer pipes outside a side wall of the case body;

an inlet pipe configured to supply a fluid to be heated into the heat-transfer pipes;

an outlet pipe configured to lead out the fluid to be heated from the heat-transfer pipes;

a temperature sensor configured to detect a temperature of a water passage formed of the heat-transfer pipes, the connecting portion, the inlet pipe, and the outlet pipe; and a sensor bracket configured to fix the temperature sensor, wherein the sensor bracket is joined and fixed to the connecting portion, at least a part of a base portion of the sensor bracket forming a mounting surface of the temperature sensor is in surface contact with a planar portion provided in the connecting portion, and the temperature sensor is secured to a joint portion of the base portion joined and fixed to the connecting portion.

According to the heat exchanger of the present invention described above, the planar portion is provided in the connecting portion connecting the pipe ends of the plurality of heat-transfer pipes, and the sensor bracket is joined and fixed to the connecting portion in a state in which a part of the base portion of the sensor bracket is in surface contact with the planar portion of the connecting portion. Further, the temperature sensor is secured to the joint portion of the base portion being in surface contact with the planar portion of the connecting portion. Thus, even if components such as the case body, the heat-transfer pipes, the connecting portion, and the sensor bracket are made of a low thermal conductive material such as stainless steel-based metal, the temperature of the water passage is promptly and reliably transmitted to the temperature sensor via the contact surface between the connecting portion and the sensor bracket. Moreover, the sensor bracket is joined and fixed to the connecting portion in a state in which the sensor bracket is in surface contact with the connecting portion. Therefore, even if a manufacturing error of the sensor bracket and an assembling error of the sensor bracket to the connecting portion occur to some extent, a contact failure is unlikely to occur between the connecting portion and the sensor bracket.

Preferably, the heat exchanger described above further comprises, a pressing member configured to press the temperature sensor against the sensor bracket, wherein the temperature sensor is secured to the joint portion of the base portion by being sandwiched between the sensor bracket and the pressing member.

In a conventional heat exchanger, a temperature sensor is directly screwed to a sensor bracket. Thus, a screw member interferes with a side wall of a case body or a water pipe outside the case body and accordingly, there is a concern that the temperature sensor is not in contact with the sensor bracket appropriately. However, according to the present invention described above, since the temperature sensor is secured to the sensor bracket in a state in which the temperature sensor is sandwiched between the sensor bracket and the pressing member, the temperature sensor can be appropriately brought into contact with the sensor bracket. Therefore, the temperature of the water passage is more promptly and reliably transmitted to the temperature sensor.

Preferably, in the heat exchanger described above, the sensor bracket and the pressing member are connected to each other by a fixing member at a position separated by a predetermined distance outward of the case body from the planar portion of the connecting portion.

According to the present invention described above, the sensor bracket and the pressing plate are connected to each other by the fixing member at the position located outward of the case body by the predetermined distance away from the planar portion of the connecting portion. Therefore, the fixing member is unlikely to interfere with the side wall of the case body, the connecting portion, and the like, and the temperature sensor can be more appropriately brought into contact with the sensor bracket. As a result, the temperature of the water passage is more promptly and reliably transmitted to the temperature sensor.

Preferably, in the heat exchanger described above, the connecting portion has a substantially box shape having an opening in one surface facing the side wall of the case body, and covering a heat-transfer-pipe fixing portion on the side wall of the case body from outside the case body, the sensor bracket is joined and fixed to the planar portion provided on the other surface opposite to the one surface in which the opening of the connecting portion is provided, and when viewed from outside the side wall of the case body, the sensor bracket is substantially disposed inward of a peripheral edge portion of the connecting portion.

According to the present invention described above, the connecting portion has a substantially box shape having an opening in the one surface facing the side wall of the case body, and the connecting portion is disposed outside the case body so as to cover the heat-transfer-pipe fixing portion on the side wall of the case body from the outside. Further, the sensor bracket is joined and fixed to the planar portion provided on the other surface opposite to the one surface in which the opening of the connecting portion is provided. If a part of the sensor bracket protrudes outwardly from the peripheral edge portion of the connecting portion in a state in which the sensor bracket is joined and fixed to the connecting portion, the sensor bracket becomes an obstacle in a joining-and-fixing work of the connecting portion to the side wall of the case body (for example, a work of applying a brazing material along a boundary between the connecting portion and the side wall of the case body when the connecting portion is brazed and fixed to the side wall of the case body). As a result, there is a concern that the sensor bracket can not be joined and fixed to the connecting portion appropriately. However, according to the present invention described above, when viewed from outside the side wall of the case body, the sensor bracket is substantially disposed inward of a peripheral edge portion of the connecting portion. Therefore, when the connecting portion is brazed and fixed to the side wall of the case body, the sensor bracket is unlikely to disturb the work and the connecting portion can be smoothly and appropriately joined and fixed to the side wall of the case body.

Although the present invention has been described in detail, the foregoing descriptions are merely exemplary at all aspects, and do not limit the present invention thereto. It should be understood that an enormous number of unillustrated modifications may be assumed without departing from the scope of the present invention.

What is claimed is:

1. A heat exchanger comprising:
   a case body;
   a plurality of heat-transfer pipes disposed in the case body;
   a connecting header configured to cover pipe ends of the plurality of heat-transfer pipes fixed on a side wall of the case body from outside the case body and connect the pipe ends of the plurality of heat-transfer pipes outside the side wall of the case body, the connecting header has a planar surface;
   an inlet pipe configured to supply a fluid to be heated into the heat-transfer pipes;
   an outlet pipe configured to lead out the fluid to be heated from the heat-transfer pipes;
   a temperature sensor configured to detect a temperature of a water passage, wherein the water passage is formed of the heat-transfer pipes, the connecting header, the inlet pipe, and the outlet pipe; and
   a sensor bracket configured to fix the temperature sensor to the sensor bracket, wherein
   the sensor bracket is joined and fixed to the connecting header,
   at least a part of a base portion of the sensor bracket forming a mounting surface of the temperature sensor is in surface contact with the planar surface provided in the connecting header, and
   the temperature sensor is secured to a joint portion of the base portion of the sensor bracket joined and fixed to the connecting header so as to detect the temperature of the water passage through the planar surface of the connecting header and the base portion of the sensor bracket.

2. The heat exchanger according to claim 1, further comprising,
   a pressing member configured to press the temperature sensor against the sensor bracket, wherein
   the temperature sensor is secured to the joint portion of the base portion by being sandwiched between the sensor bracket and the pressing member.

3. The heat exchanger according to claim 2, wherein
   the sensor bracket and the pressing member are connected to each other by a fixing member at a position separated by a predetermined distance outward of the case body from the planar surface of the connecting header.

4. The heat exchanger according to claim 1, wherein
   the connecting header has an opening in one surface facing the side wall of the case body,
   the sensor bracket is joined and fixed to the planar surface provided on another surface opposite to the one surface in which the opening of the connecting header is provided, and
   when viewed from outside the side wall of the case body, the sensor bracket is disposed inward of a peripheral edge portion of the connecting header.

* * * * *